Oct. 5, 1926.  
A. B. CARMACK  
ANIMAL TRAP  
Filed May 20, 1926  
1,601,848  
2 Sheets-Sheet 1
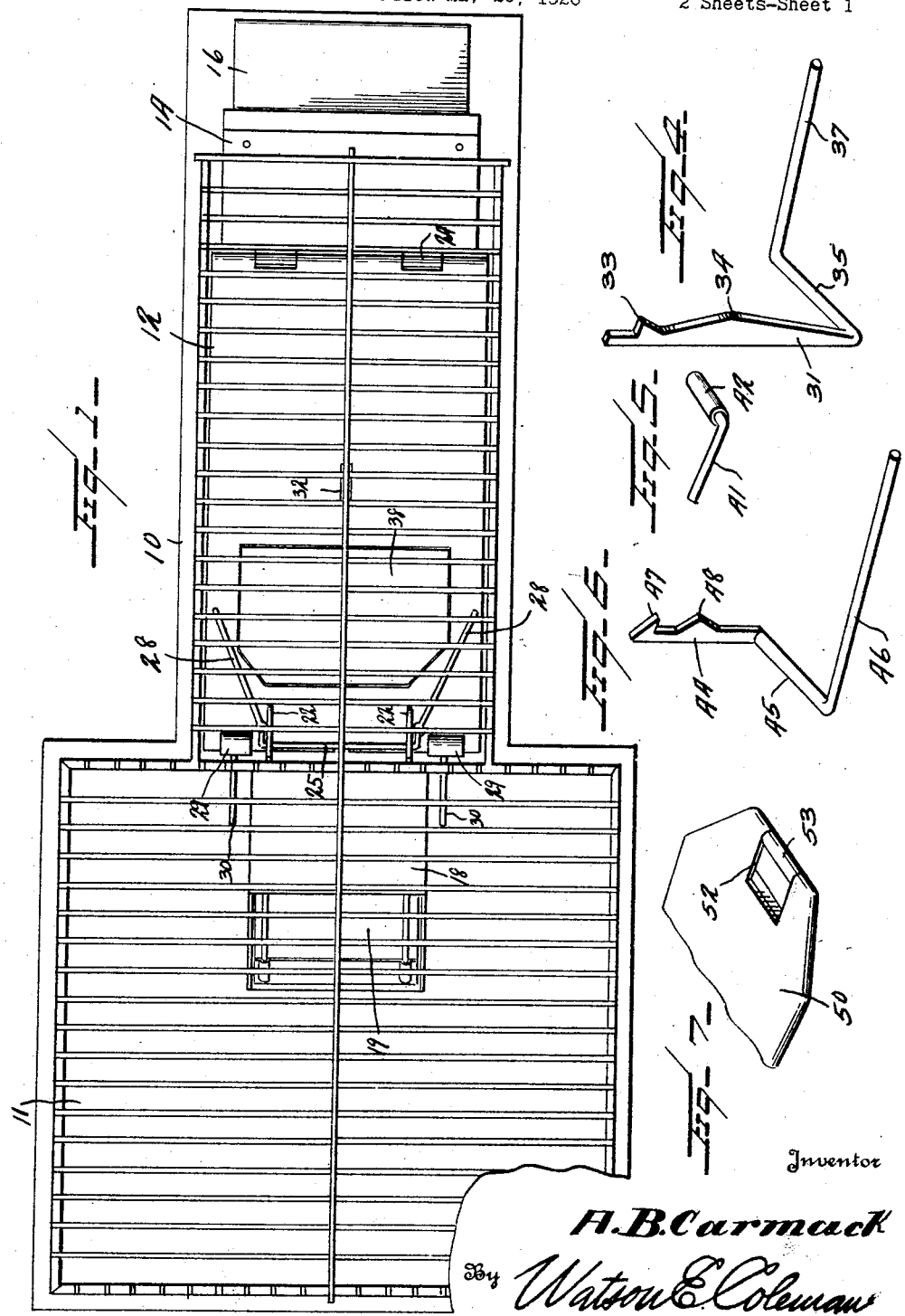

Oct. 5, 1926.
A. B. CARMACK
ANIMAL TRAP
Filed May 20, 1926
1,601,848
2 Sheets-Sheet 2
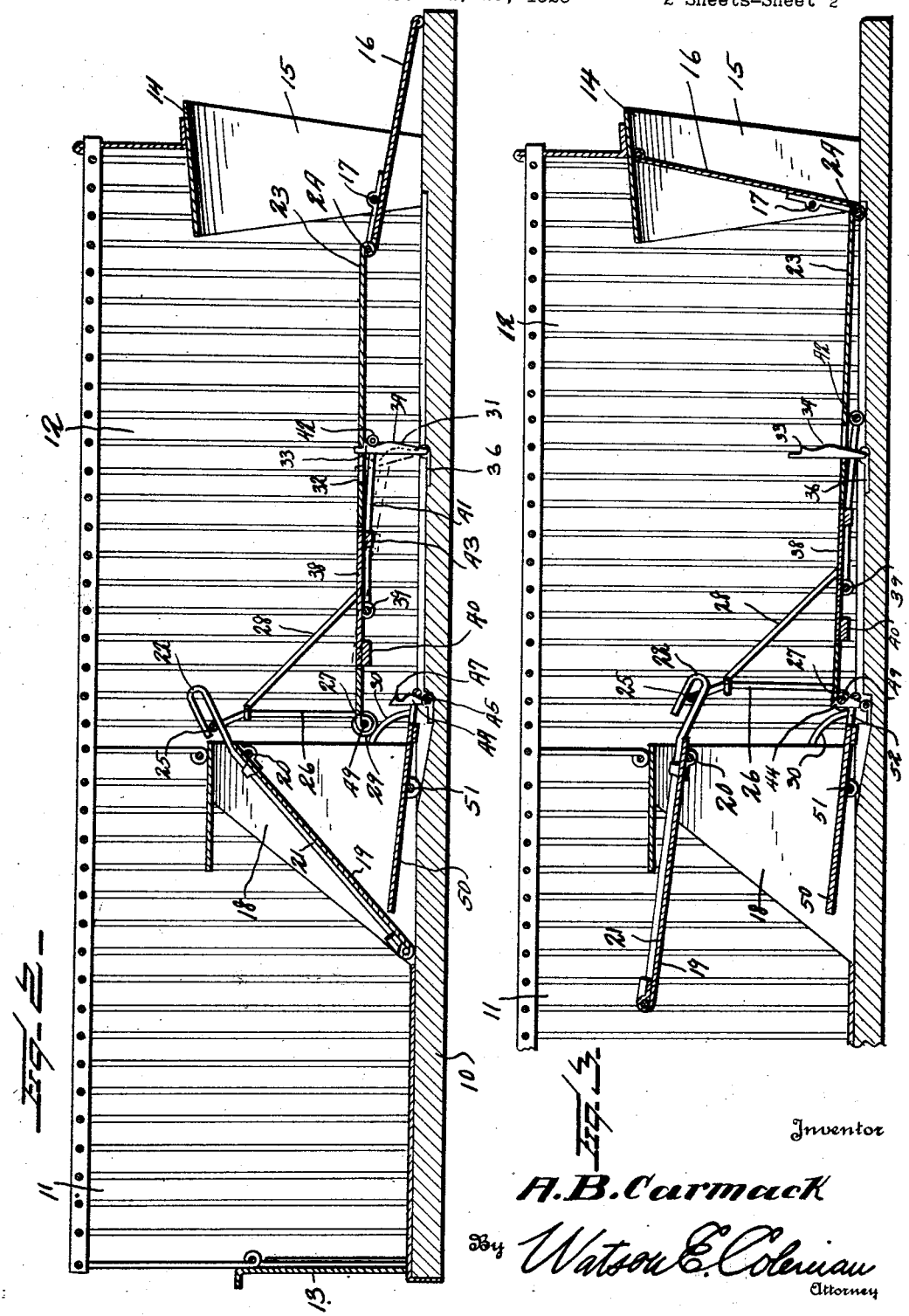
Inventor
A.B. Carmack
By Watson E. Coleman
Attorney Patented Oct. 5, 1926.

1,601,848

UNITED STATES PATENT OFFICE.

ARTHUR B. CARMACK, OF CURVE, TENNESSEE, ASSIGNOR OF ONE-HALF TO AUSTIN E. ANDERSON, OF CURVE, TENNESSEE.

ANIMAL TRAP.

Application filed May 20, 1926. Serial No. 110,520.

This invention relates to traps such as are used for catching rats, mice and other small animals and particularly to those traps having automatically opening and closing doors whereby the animal may gain entrance to the trap but cannot escape therefrom, the trap being so constructed as to not injure the animal in any way and thus being particularly adapted for catching animals whose fur must be uninjured in order to be valuable.

A further object of the invention is to provide a trap having an entrance portion and a body portion or cage and having doors permitting the animal to enter the entrance portion of the trap and to pass into the body portion and having a treadle or platform which, under the weight of the animal, will cause the closing of the entrance door and the opening of the door into the trap and having another treadle or platform which, as the animal passes into the body portion of the trap, will cause the closing of the last named door and the opening of the entrance door, thus rendering the trap an automatically resetting trap.

Other objects have to do with the details of construction and arrangement of parts to appear more fully hereinafter.

My invention is illustrated in the accompanying drawings wherein:—

Figure 1 is a top plan view of a trap constructed in accordance with my invention;

Fig. 2 is a longitudinal vertical sectional view therethrough;

Fig. 3 is a fragmentary section as in Figure 2 but showing the trap sprung;

Fig. 4 is a perspective view of the platform latch;

Fig. 5 is a perspective view of the device for operating the latch;

Fig. 6 is a perspective view of the treadle latch;

Fig. 7 is a fragmentary perspective view of one end of the treadle.

Referring to these drawings it will be seen that the trap consists of a base 10 of wood or metal, a relatively square body portion 11 which, of course, may be made of any suitable shape and a somewhat elongated entrance portion 12. The portions 11 and 12 are preferably made of open work wire construction as usual. The body 11 has a sliding door 13 whereby animals may be taken from the trap.

The entrance end of the entrance portion 12 is closed by a plate 14 and by a door frame 15 preferably of sheet metal and operating in this door frame is the door 16 which is pivoted upon a transverse rod 17 and projects inward beyond this rod. Normally this door is disposed in an upwardly and rearwardly inclined position, as shown in Figure 2.

Forming a continuation of the entrance passage is a doorway or frame 18, the sides of which have their rear edges downwardly and rearwardly extended and operating within this doorway is the door 19 which is pivoted upon a transverse rod 20. This door is made of sheet metal and braced by means of two longitudinally extending rods 21 which extend beyond the pivotal center of the door and are bent to form elongated eyes 22.

Disposed within the entrance portion 12 of the trap is a platform 23 preferably of suitably braced sheet metal which, at its forward end, is hingedly connected to the door 16 at 24. The forward end of this platform is supported by means of a U-shaped rod, the middle portion 25 of which extends transversely through the eyes 22 while the legs 26 of the U-shaped rod extend downward and constitute hangers which support the forward end of the platform at 27. Braces 28 having eyes at their upper ends through which the legs 26 pass extend downward and forward to the side margins of the platform 23. This platform at its forward edge is provided with rollers 29 and mounted upon the base 10 just exteriorly of the vertical portions of the frame 18 are approximately U-shaped guide members or cams 30 which extend downward and rearward immediately beneath the rollers 29 so that when the platform moves downward, the rollers will strike these cams and the platform will be urged rearward.

Mounted upon the base 10 is a latch 31 extending upward through the slot 32 in the platform. This latch at its upper end is formed with upwardly facing shoulder 33 and below this shoulder with a rearwardly bulged portion 34. The latch proper is mounted upon a transverse shaft 35 engaged by the bead 36 which pivotally supports the latch and the opposite end of this shaft 35 from the latch is formed with a rearwardly extending arm 37.

So long as the shoulder 33 is beneath the platform, the platform cannot descend under the weight of an animal but when the latch is retracted the platform may descend and thereby cause the door 16 to be shifted into its vertical position.

For the purpose of releasing this latch automatically I provide a rectangular opening in the platform within which is disposed a treadle or tilting plate 38. This is mounted upon a transversely extending pivot rod 39 and has a slight counterweight 40 attached to its forward margin. Extending rearward from this plate and beneath the platform is an arm 41 which, at its rear end, is angularly bent and carries a bead or roller 42. When the forward margin of the treadle 38 is depressed this arm moves downward and the roller or bead 42 engages the protuberant portion 34 of the latch and thus shifts the latch forward releasing the engagement of the shoulder 33 with the platform and permitting the platform to descend. This arm 41 passes through a slot in a transverse brace 43 extending beneath the platform.

When the treadle 38 has been depressed and the latch 31 released, the platform 38 descends and in doing so, the rods 26 pull downward on the upper ends of the rods 21, thus releasing the door 19. For the purpose of latching the door 19 in its raised position until the animal has entered the cage 11, I provide a second latch 44. This latch is pivoted in a recess in the base and is mounted upon a transversely extending rock shaft 45 having a rearwardly extending arm 46 also normally disposed within a recess. The latch is formed with the bill 47 and beneath this bill with the protuberant portion 48. As the platform descends it moves rearward and downward and a transversely extending cross bar 49 which constitutes the forward edge of the platform strikes the beveled upper end of the hook and shifts the hook rearward. As soon as the platform has descended below the hook, the platform will strike the arm 46, causing the hook to move forward and engage over the rod 49, thus latching the platform in its depressed position and latching the door 19 in its raised position.

For the purpose of causing the automatic closing of the door 19 I pivotally support within the door frame 18 the treadle 50. This is supported upon a transverse rock shaft or rod 51 and this treadle extends beneath the forward end of the platform 38. The forward end of this treadle is cut away as at 52 so as to pass downward over the latch 44 and the forward end of the treadle carries a transversely extending rod 53 constituting the forward end of the slot 52. This rod, when the treadle 50 moves downward under the weight of an animal, strikes the protuberant portion 48 of the latch 44 and acts to withdraw the latch, thus permitting the door 19 and the door 16 to spring to their closed and open positions respectively and the platform to rise, and the trap is thus automatically reset.

In the operation of this mechanism it will be seen that when the animal enters the trap the platform 38 is raised and the door 19 is closed while, of course, the door 16 is open. When the weight of the animal is upon the forward portion of the treadle 38, the treadle is depressed, releasing the latch 34. The platform then descends bodily under the weight of the animal, causing the closing of the door 16 and the opening of the door 19. The platform is then latched in its lowered position. The animal passes off the platform onto the treadle 50 and as soon as his weight has counterbalanced the treadle, the rear end of the treadle descends, thus releasing the latch 44, permitting the door 19 to close and again opening the door 16. It is in order to prevent any chance of the platform 23 sticking and causing the platform to move rearward and downward that I have provided the guides or cams 30 against which the rollers 29 bear so that the platform is positively shifted rearward and downward. It will be seen that inasmuch as this trap is automatically reset, any number of animals may enter the trap and be caught. I have not illustrated any bait holding means as any means may be provided for this purpose.

It will be seen that by providing the arms 36 and 46 on the latches that these latches will be automatically thrown or shifted into their latching positions upon the descent of the platform 23 and the treadle 50 respectively.

While I have illustrated certain details of construction and arrangement of parts which I have found to be particularly effective in actual practice, it is obvious that many changes might be made therein within the scope of the appended claims.

I claim:—

1. In a trap, a body and an entrance passageway leading thereto, a door pivotally mounted at its lower end at the entrance of the passageway, an intermediate door pivotally mounted at its upper end between the passageway and the body of the trap, a platform disposed within the passageway and hingedly connected to the first named door, links connecting the forward end of the platform to the upper end of the intermediate door when the platform descends, a latch holding the platform raised, means carried by the platform and operated by the weight of the animal causing the release of the latch to thus permit the descent of the platform under the weight of the animal, a treadle mounted within the body of the trap, a latch holding the platform lowered, and means operated by the treadle for releasing the last named latch.

2. In a trap, a body and a passageway having an entrance doorway, a door pivoted adjacent its lower end in the entrance doorway, an inner door lying aproximately in a horizontal position, a door hingedly mounted adjacent its upper end and disposed between the passageway and the body of the trap, a platform constituting the floor of the entrance passageway and depressible under the weight of an animal, said platform at its rear end being hingedly engaged with the adjacent end of the entrance door, arms extending from the upper end of the second named door, a link connection between the forward end of the platform and said arms whereby to cause the raising of the door when the platform is lowered, a latch normally holding the platform raised and the entrance door open, a treadle mounted upon the platform and operatively engaged with the latch to cause the retraction of the latch when the treadle is shifted under the weight of an animal, a treadle disposed beneath the second named door, a latch acting to engage the platform when it is lowered and hold it lowered, said treadle when depressed under the weight of an animal acting to release said second named latch and permit the platform to rise and thus open the entrance door and close the second named door.

3. In a trap, a body and a passageway having an entrance doorway, a door pivoted adjacent its lower end in the entrance doorway, an inner door lying approximately in a horizontal position, a door hingedly mounted adjacent its upper end and disposed between the passageway and the body of the trap, a platform constituting the floor of the entrance passageway and depressible under the weight of an animal, said platform at its rear end being hingedly engaged with the adjacent end of the entrance door, arms extending from the upper end of the second named door, a link connection between the forward end of the platform and said arms whereby to cause the raising of the door when the platform is lowered, a latch normally holding the platform raised and the entrance door open, a treadle mounted upon the platform and operatively engaged with the latch to cause the retraction of the latch when the treadle is shifted under the weight of an animal, a treadle disposed beneath the second named door, a latch acting to engage the platform when it is lowered and hold it lowered, said treadle when depressed under the weight of an animal acting to release said second named latch and permit the platform to rise and thus open the entrance door and close the second named door, and means acting to positively shift the platform rearward as it descends.

4. A trap of the character described comprising a body and an entrance passageway, there being a door frame disposed between the passageway and the body of the trap, a door pivotally mounted adjacent its lower end at the entrance of said passageway, a door pivotally mounted in the door frame and adjacent its upper end, said door having rearwardly extending arms formed with eyes, a platform extending the entire length of the passageway, a link connecting the forward edge of said platform with said eyes, a hinged connection between the rear end of the platform and the lower edge of the first named door, a latch mounted upon the base of the trap and extending upward through a slot in the platform, said latch having a shoulder at its upper end and a protuberant portion below the upper end, a tilting treadle mounted in the platform having a rearwardly extending arm formed with a roller adapted to engage the protuberant portion of the latch when the treadle is tilted to thus retract the latch and permit the descent of the platform, a second latch disposed between the forward end of the platform and having a bill at its upper end adapted to engage over the forward end of the platform when the latter is depressed, the latch having a protuberant portion below the bill, a treadle mounted within the door frame between the body and passageway and having a slot accommodating the last named latch, and a member adapted to engage the protuberant portion of said last named latch when the treadle is depressed to thereby retract the latch.

In testimony whereof I hereunto affix my signature.

ARTHUR B. CARMACK.